United States Patent [19]
Sumida et al.

[11] 4,136,333
[45] Jan. 23, 1979

[54] TERMINAL SIGNAL OPERATION APPARATUS

[75] Inventors: Shizuo Sumida; Kazuo Nii, both of Hiroshima; Osamu Shimizu, Himeji; Atsushi Ueda, Himeji; Mitsuaki Ishii, Himeji, all of Japan

[73] Assignees: Mitsubishi Denki Kabushiki Kaisha, Tokyo; Toyo Kogyo Co., Ltd., Hyogo, both of Japan

[21] Appl. No.: 712,776

[22] Filed: Aug. 9, 1976

Related U.S. Application Data

[63] Continuation-in-part of Ser. No. 678,443, Apr. 19, 1976, abandoned, which is a continuation of Ser. No. 501,987, Aug. 30, 1974, abandoned.

[30] Foreign Application Priority Data

Sep. 3, 1973 [JP] Japan .............................. 48-99405
Sep. 3, 1974 [DE] Fed. Rep. of Germany ....... 2442067

[51] Int. Cl.² ............................................. H04Q 9/00
[52] U.S. Cl. .............................. 340/147 C; 340/163; 340/147 R; 340/151
[58] Field of Search ............... 340/167 A, 147 R, 409, 340/151, 163, 226, 147 C

[56] References Cited

U.S. PATENT DOCUMENTS

| | | | |
|---|---|---|---|
| 3,222,646 | 12/1965 | Hammer | 340/226 |
| 3,289,166 | 11/1966 | Emmel | 340/167 A |
| 3,522,588 | 8/1970 | Clarke | 340/147 R |
| 3,566,399 | 2/1971 | Weld | 340/409 |
| 3,634,824 | 1/1972 | Zinn | 340/167 A |
| 3,715,723 | 2/1973 | Fletcher | 340/147 R |
| 3,803,594 | 4/1974 | Klein | 340/409 |
| 3,806,872 | 4/1974 | Odom | 340/147 R |
| 3,854,122 | 12/1974 | Cross | 340/151 |

*Primary Examiner*—Harold I. Pitts
*Attorney, Agent, or Firm*—Oblon, Fisher, Spivak, McClelland & Maier

[57] ABSTRACT

A terminal signal operation apparatus is disclosed for transmitting in a multiplex transmission system in both directions signals between the terminal signal operation apparatus and a central operation apparatus for centrally generating control signals for controlling a plurality of electrical devices at terminals in accordance with a signal generated by a signal source. The terminal signal operation apparatus includes a signal separation circuit for detecting the control signals transmitted from the central operation apparatus, a driving circuit whose input is connected to the output of the signal separation circuit for driving an electrical device in accordance with the control signals, a return signal generating circuit for generating a signal for transmission to the central operation apparatus upon detection of a malfunction of the electrical device or a malfunction of the signal source or a signal from the signal source so that the signals in both directions between the terminal signal operation apparatus and the central operation apparatus can be processed by a single circuit.

30 Claims, 3 Drawing Figures

TERMINAL SIGNAL OPERATION APPARATUS

CROSS REFERENCE TO RELATED APPLICATIONS

This application is a continuation-in-part application of patent application Ser. No. 678,443 filed Apr. 19, 1976, now abandoned, which in turn is a continuation application of patent application Ser. No. 501,987 filed Aug. 30, 1974, now abandoned.

BACKGROUND OF THE INVENTION

1. Field of the Invention

The present invention relates to a terminal signal operation apparatus for transmitting in both directions through a multiplex transmission system between the terminal signal operation apparatus and a central processing apparatus in order to control a plurality of electrical devices.

2. Description of the Prior Art

In general, the various control apparatus for the electrical devices of vehicles e.g. cars, ships and airplanes are quite complicated with the result that the wiring therefore is difficult to install and difficult to maintain in proper working order. It is believed that the use of a multiplex transmission system can alleviate much of the complexity. It is also believed that the use of devices to detect malfunctions would also be quite helpful. In order to accomplish this, it is necessary to have a transmitting device for transmitting a multiple signal; a receiving device for controlling the electrical devices in accordance with the multiple signal; and a malfunction signal returning device for returning a malfunction signal upon detection of a malfunction of the electrical device.

SUMMARY OF THE INVENTION

It is an object of the present invention to provide a terminal signal operation apparatus comprising a transmitting device, a receiving device and a malfunction signal returning device which is simplified by employing a common circuit for the transmitting device and the malfunction signal returning device.

The foregoing and other objects are attained in accordance with one aspect of the present invention through the provision of a terminal signal operation apparatus for transmitting in a multiplex transmission system in both directions signals between the terminal signal operation apparatus and a central operation apparatus for centrally generating control signals for controlling a plurality of electrical devices at terminals in accordance with a signal generated by a signal source comprising: a signal separation circuit for detecting the control signals from the central operation apparatus; a driving circuit whose input is connected to the output of the signal separation circuit for driving an electrical device in accordance with the control signals; a return signal generating circuit for generating a signal for transmission to the central operation apparatus upon detection of malfunction of the electrical device or a malfunction of the signal source or a signal from the signal source whereby the signals in both directions between the terminal signal operation apparatus and the central operation apparatus can be processed by a single circuit.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
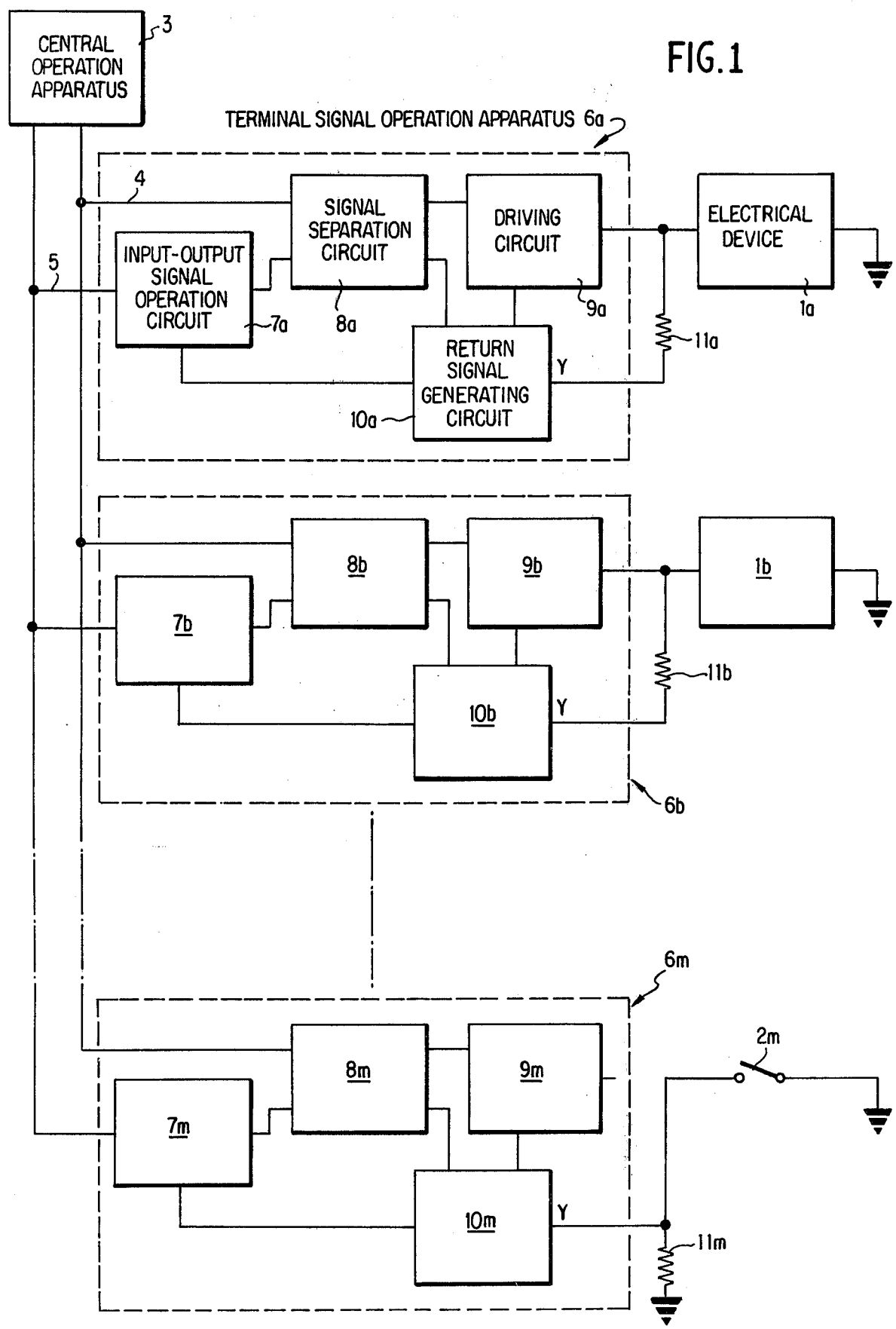
FIG. 1 is a block diagram showing one embodiment of the invention.

Referring now to the drawings, wherein like references designate identical or corresponding parts throughout the views, especially FIG. 1, a preferred embodiment of the invention is illustrated. In FIG. 1, a plurality of electrical devices are controlled by a plurality of switches but only two electrical devices and one switch are shown. In FIG. 1, the reference numerals 1a, 1b designate electrical devices; 2m designates a signal source switch; 3 designates a central operation apparatus for generating a reference timing signal and a control signal; 4 designates a reference timing signal transmission line; 6a, 6b respectively designate terminal signal operation apparatus for controlling the electrical devices 1a, 1b depending upon the signal from the central operation apparatus 3; 6m designates a terminal signal operation apparatus for transmitting the signal given by the switch 2m and has the same structure as that of 6a, 6b; 7a, 7b, 7m respectively designate input-output signal operation circuits; 8a, 8b, 8m respectively designate signal separation circuits; 9a, 9b, 9m respectively designate driving circuits; 10a, 10b, 10m respectively designate circuits for generating return signals for transmitting signals indicating a fault of the electrical device 1a or 1b or a state of the switch 2m; and 11a, 11b, 11m respectively designate resistances.

Figure 2:
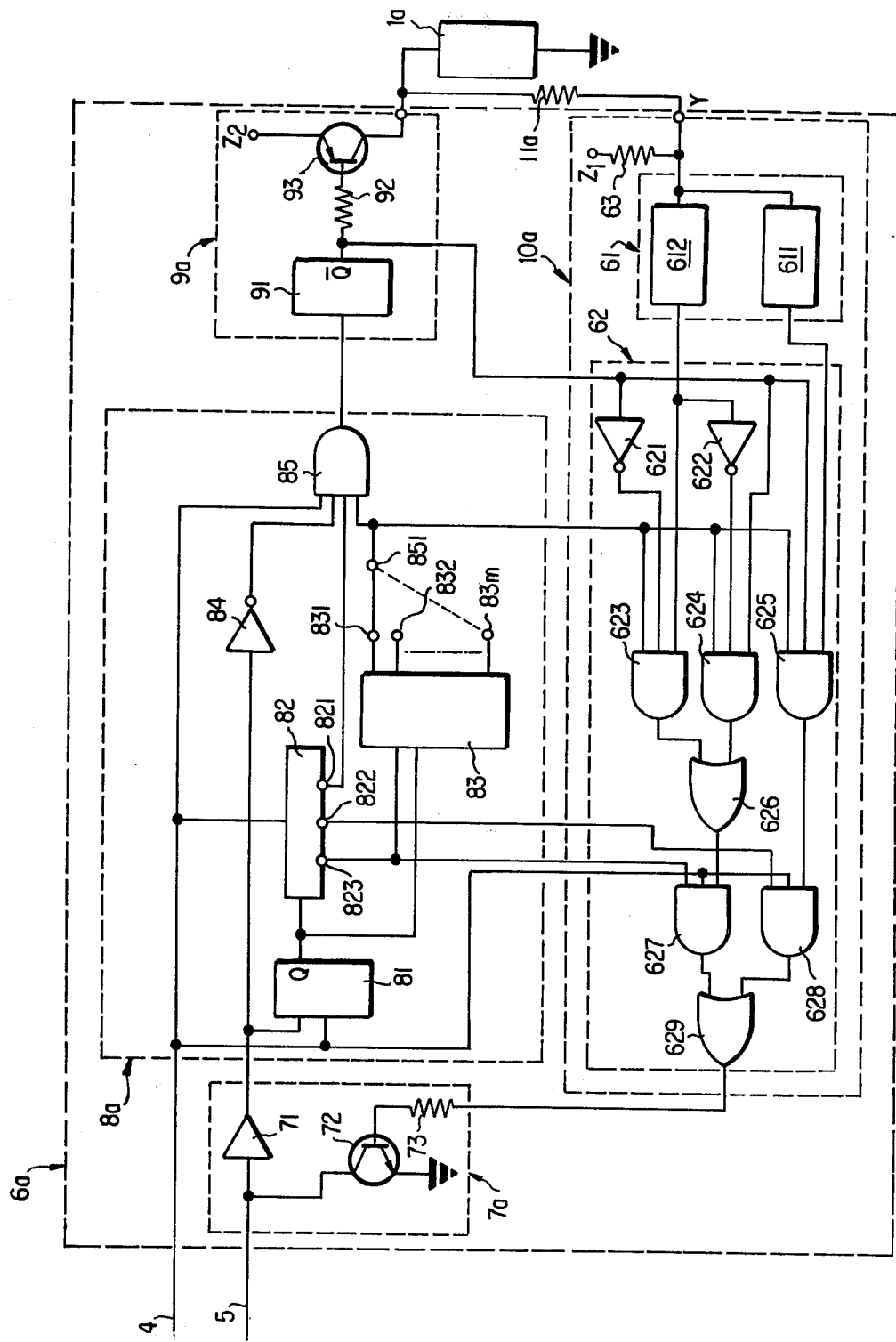
FIG. 2 is a schematic of the circuitry of block 6a of FIG. 1.

FIG. 2 shows the circuitry of terminal signal operation apparatus 6a and connections thereto including electrical device 1a, reference timing signal transmitting line 4, control signal transmitting line 5, input-output operation circuit 7a, buffer circuit 71, transistor 72, resistor 73, signal separation circuit 8a, flip-flop circuit 81, counters 82, 83, NOT circuit 84, AND circuit 85, driving circuit 9a, monostable multivibrator 91, resistor 92, transistor 93, power source terminal $Z_2$, return signal generating circuit 10a, input terminal Y for circuit 10a, potential detecting circuit 61, potential $V_1$ detecting circuit 611, potential $V_2$ detecting circuit 612, return signal composite circuit 62, NOT circuits 621, 622, AND circuits 623, 624, 625, 627, 628, OR circuits 626, 629, resistor 63, power source terminal $Z_1$, output terminals 821, 822, 823 of counter 82, output terminals 831, 832, . . . 83m of counter 83, input terminal 851 of AND circuit 85, and resistor 11a.

Figure 3:
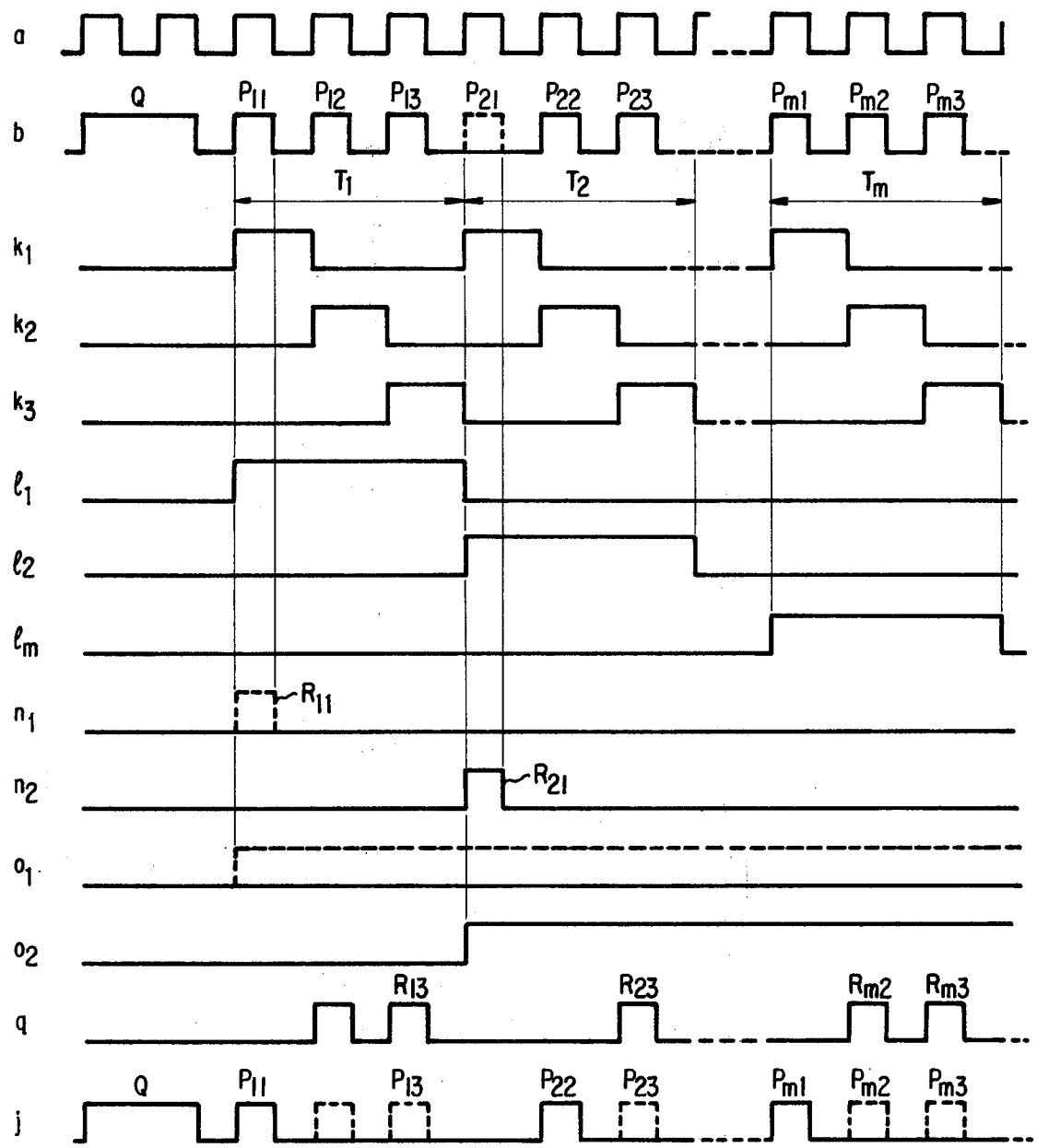
FIG. 3 is a time chart for illustrating the operation of the circuitry of FIG. 2.

FIG. 3 is a time chart for illustrating the operation of the circuitry of FIG. 2. FIG. 3 shows a reference timing signal a, a control signal b transmitted from the central operation apparatus 3, output signals $k_1$, $k_2$, $k_3$ of the terminals 821, 822, 823 of the counter 82, output signals $l_1, l_2, \ldots l_m$ of the terminals 831, 832, . . . 83m of the counter 83, an output signal $n_1$ of the AND circuit 85, an output signal $o_1$ of the transistor 93, an output signal q of the OR circuit 629, and a composite signal j which is realized by combining the control signal b transmitted from the central operation apparatus 3 and the output signal of the OR circuit 629 in the input-output signal operation circuit 7a and which is transmitted over control signal transmitting line 5. The operation of the circuitry of FIG. 2 will be illustrated with reference to FIG. 3.

The control signal b which is a channel signal formed by three pulses is applied through the buffer circuit 71 to the signal separation circuit 8a during the channel times $T_1, T_2, \ldots T_m$ which correspond to the synchronizing signal Q and the terminal signal operation apparatus 6a, 6b, ... 6m. The synchronizing signal Q in the control signal b is detected by the flip-flop 81 depending upon the pulse width of two pulses of the reference timing signal a, whereby the counter 82 and the counter 83 are reset. The counter 82 counts the reference timing signal a to output the signals $k_1, k_2, k_3$ to the output terminals 821, 822, 823. The counter 83 counts the signal of the output terminal 823 of the counter 82 to output the signals $l_1, l_2, \ldots l_m$ for discriminating the channel times $T_1, T_2, \ldots T_m$ with respect to the corresponding output terminals 831, 832, ... 83m.

The input terminal 851 is connected to one of the output terminals 831, 832, ... 83m selected by the correspondence of the terminal signal operation apparatus 6a to one of the channel times $T_1, T_2, \ldots T_m$. In FIG. 2, the input terminal 851 is connected to the output terminal 831. Accordingly, the terminal signal operation apparatus 6a corresponds to the channel time $T_1$ to effect the transmission of the signal with the central operation apparatus during the channel time. The AND circuit 85 provides the logical product of the reference timing signal a and the negative phase signal for the control signal passed through the NOT circuit 84, and the signals $k_1$ and $l_1$.

The signal pulse $P_{11}$ in the control signal b includes data for driving the electrical device 1a and is transmitted from the central operation apparatus 3. The signal pulse $P_{11}$ is at the H level. Accordingly, the AND circuit 85 does not output the signal pulse $R_{11}$ as shown in FIG. 3($n_1$). The output signal of the monostable multivibrator 91 is at the H level. Accordingly, the transistor 93 is not turned on as shown in FIG. 3($o_1$) whereby the electrical device 1a is not driven.

On the contrary, when the signal pulse $P_{11}$ is at the L level (not shown), the AND circuit 85 generates the signal pulse $R_{11}$ shown by a broken line in FIG. 3($n_1$). The output signal of the monostable multivibrator 91 is at the L level. Accordingly, the transistor 93 is turned on as shown by the broken line of FIG. 3($o_1$), whereby the electrical device 1a is driven.

Figure 4:
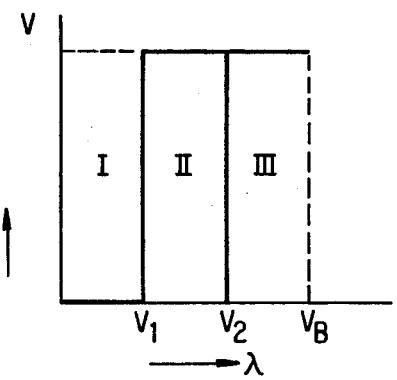
FIG. 4 illustrates the input-output characteristics of the potential detecting circuits 611, 612 shown in FIG. 2.

The operation of the return signal generating circuit 10a will now be described. The potential detecting circuit 61 includes the potential $V_1$ detecting circuit 611 and the potential $V_2$ detecting circuit 612 which have different detecting potentials. FIG. 4 shows the input-output characteristics of the two potential detecting circuits 611, 612. In the potential $V_1$ detecting circuit 611, the output signal is turned over at the input potential $V_1$. In the potential detecting circuit 612, the output signal is turned over at the input potential $V_2$. The resistor 11a has the same resistance as the resistor 63 and the resistors 11a and 63 are set at a high resistance so as to be able to neglect the resistance of the electrical device 1a.

As stated above, when the signal pulse $P_{11}$ is transmitted from the central operation apparatus at the H level, the output of the monostable multivibrator 91 is at the H level and the electrical device 1a is turned off. When the electrical device 1a is in its normal state, the potentials divided by the resistors 63 and 11a are respectively applied to the potential $V_1$ detecting circuit 611 and the potential $V_2$ detecting circuit 612.

The resistor 63 has the same resistance as the resistor 11a and half of the potential of the power source voltage $V_B$ is applied to the potential detecting circuit 61. Accordingly, as shown in FIG. 4, the output terminal of the potential $V_1$ detecting circuit 611 is at the H level and the output terminal of the potential $V_2$ detecting circuit 612 is at the L level. In this state, the AND circuit 624 outputs the signal at the H level during the time signal $l_1$ of FIG. 3 is generated. Accordingly, the output signal of the OR circuit 626 is at the H level. The AND circuit 627 provides the logical product of the output signal of the OR circuit 626, the signal $k_3$ and the reference timing signal a. As a result, the OR circuit 629 generates the signal pulse $R_{13}$ is shown in FIG. 3($q$) to drive the transistor 73. As the transistor 73 is turned on, the control signal transmitting line 5 is grounded through the transistor 72 during the time signal pulse $R_{13}$ is generated. The signal pulse $P_{13}$ is not generated as shown in FIG. 3($j$) and is at the L level.

If the electrical device 1a is interrupted in this state, the power source voltage is applied to the input terminals of the potential $V_1$ detecting circuit 611 and the potential $V_2$ detecting circuit 612. Accordingly, the output terminals of the potential $V_1$ detecting circuit 611 and the potential $V_2$ detecting circuit 612 are at the H level. Accordingly, the output of the AND circuits 623, 624 are at the L level and the output of the OR circuit 626 is at the L level. During this time, the OR circuit 629 does not generate the signal pulse $R_{13}$ shown in FIG. 3($q$) and, accordingly, the transistor 72 is turned off and the signal pulse $P_{13}$ shown in FIG. 3($j$) is transmitted over the control signal transmitting line 5.

The operation of driving the electrical device by the central operation apparatus 3 with the signal pulse $P_{11}$ of FIG. 3($b$) at the L level will now be described. The input signal operation circuit 7a and the signal separation circuit 8a are operated as stated above, and the output pulse $R_{11}$ of the AND circuit 85 is at the H level. The output of the monostable multivibrator 91 is at the L level. The transistor 93 is turned on to drive the electrical device 1a.

As the power source voltage is applied to the electrical device 1a, the power source voltage is also applied to the potential $V_1$ detecting circuit 611 and the potential $V_2$ detecting circuit 612. Accordingly, the output terminals of the potential $V_1$ detecting circuit 611 and the potential $V_2$ detecting circuit 612 are at the H level, and the AND circuit 623 is at the H level and the OR circuit 626 is at the H level. Accordingly, the OR circuit 629 generates the signal pulse $R_{13}$ shown in FIG. 3($q$) to turn on the transistor 72. Accordingly, the signal pulse $P_{13}$ shown in FIG. 3($j$) is not realized on control signal transmitting line 5 and is at the L level.

In this condition, when the contact between the transistor 93 and the electrical device 1a is grounded, that is a short-circuit is effected, the potentials divided by the resistor 63 and the resistor 11a are respectively applied to the potential $V_1$ detecting circuit 611 and the potential $V_2$ detecting circuit 612. In this case, the output terminal of the potential $V_1$ detecting circuit 611 is at the H level and the output terminal of the potential $V_2$ detecting circuit 612 is at the L level. Accordingly, the AND circuits 623, 624 are at the L level and the OR circuit 626 is at the L level. Accordingly, the OR circuit 629 does not generate the signal pulse $R_{13}$ of FIG. 3(q) and the transistor 72 is in the OFF state during this time, whereby the signal pulse $P_{13}$ of FIG. 3(j) is transmitted over the control signal transmitting line 5.

As stated above, when the electrical device 1a is in its normal state, the signal pulse $P_{13}$ is not realized on the control signal transmitting line 5 and is at the L level. When the breaking or short-circuit of the electrical device 1a is effected, the signal pulse $P_{13}$ is realized on the control signal transmitting line at the H level. Accordingly, the state of the signal pulse $P_{13}$ can be detected by the central operation apparatus 3 and the fault of the electrical device 1a can be detected.

In the terminal signal operation apparatus 6a, the output terminal 831 of the counter 83 connected to the input terminal 851 of the AND circuit 85 is modified with respect to the output terminal 832 in order to realize the corresponding channel time $T_2$. The output signal of the signal separation circuit 8b is shown in FIG. 3($n_2$). The output signal of the driving circuit 9a is shown in FIG. 3($o_2$). The operation is the same as that of terminal signal operation apparatus 6a.

The terminal signal operation apparatus 6m of FIG. 1 will now be described. The structure of the apparatus 6m is the same as the structure of the apparatus 6a with the exception that the connection is modified as shown in FIG. 1 where the switch 2m replaces the electrical device 1a. The resistor 11m is directly connected to the switch 2m and the resistor 11m is connected to the input terminal Y.

Since the structure of the terminal signal operation apparatus 6m is the same as that of the apparatus 6a, the operation of the apparatus 6m will be described with reference to FIG. 1.

In order to change the corresponding channel time to $T_m$, the input terminal 851 of the AND circuit 85 is connected to the output terminal 83m of the counter 83. The central operation apparatus 3 normally transmits the signal pulse $P_{m1}$ shown in FIG. 3(b) to the switch 2m. Accordingly, the transistor 93 is normally in the OFF state. When the switch 2m is in the ON state, the output terminal Y is grounded, and the output terminals of the potential $V_1$ detecting circuit 611 and the potential $V_2$ detecting circuit 612 are respectively at the L level.

The AND circuit 625 outputs the L level signal during the time the signal shown in FIG. 3($l_m$) is generated. Accordingly, the OR circuit 629 does not generate the signal pulse $R_{m2}$ shown in FIG. 3(q) and it is at the L level. The transistor 72 is turned off to realize the signal pulse $P_{m2}$ on the control signal transmitting line 5.

When the switch 2m is turned off, the voltages divided by the resistor 63 and the resistor 11m are respectively applied to the potential $V_1$ detecting circuit 611 and the potential $V_2$ detecting circuit 612. The resistance of the resistor 63 is the same as that of the resistor 11m whereby the divided potential is half of the power source voltage $V_B$. In this case, the AND circuit 625 outputs the H level signal during the time the signal shown in FIG. 3($l_m$) is generated. Accordingly, the OR circuit 629 generates the signal pulse $R_{m2}$ shown in FIG. 3(q) to turn on the transistor 72 whereby the signal pulse $P_{m2}$ is not realized on the control signal transmitting line 5 and it is at the L level.

The case of breaking the line of the switch 2m will now be described. The resistor 11m is directly connected to the switch 2m. Accordingly, when the line is broken, the power source voltage is applied to the input terminals of the potential $V_1$ detecting circuit 611 and the potential $V_2$ detecting circuit 612.

The condition is the same as the case of breaking the electrical device 1a in the OFF state of the transistor 93. Accordingly, the OR circuit 629 does not output the signal pulse $R_{m3}$ shown in FIG. 3(q) to turn off the transistor 72, whereby the signal pulse $P_{m3}$ is realized on the control signal transmitting line 5. On the contrary, when the line of the switch is in the normal state, the signal pulse $P_{m3}$ is not realized on the control signal transmitting line 5 and it is at the L level.

As stated above, the ON-OFF information of the switch 2m can be detected depending upon the presence of the signal pulse $P_{m2}$. The breaking of the line of the switch can be detected depending upon the presence of the signal pulse $P_{m3}$. The central operation apparatus 3 obtains the information of the switch 2m depending upon the states of the signal pulses $P_{m2}$ and $P_{m3}$.

As stated above, the terminal signal operation apparatus 6a of FIG. 1 can be selectively connected with the electrical device or the switch without modifying the structure whereby the transmission of the signals can be effected between the central operation apparatus and the electrical device or the switch.

In these embodiments, it is possible to provide a plurality of terminal signal operation apparatus corresponding to the electrical devices i.e., the controlled devices and the switches i.e., the signal sources. For example, only one terminal signal operation apparatus may be connected to the controlled device. In another case, one or more terminal signal operation apparatus for the controlled device and one or more terminal signal operation apparatus for the power source can be connected.

The input-output signal operation circuit, the signal separation circuit, the driving circuit, the returning signal generating circuit and the connections of the circuits are preferably formed by an IC (semiconductor integration circuit) or a printed wiring circuit.

In the embodiment of FIG. 1, the unit channel time period of the control signal is composed of the three signal pulses. However, the number of the signal pulses is not limited. In the embodiment of FIG. 1, one terminal signal operation apparatus operates the signal of one electrical device or one switch. However, it is possible to commonly utilize a plurality of terminal signal operation apparatus. As stated above, in accordance with the invention, in both operating the electrical devices and transmitting the signal given by the signal source switches, only a single terminal signal operation apparatus need be used. The invention also lends itself to the formation of an integrated circuit by commonly utilizing the terminal signal operation apparatus. When the terminal signal operation apparatus are grouped for the case of a vehicle such as a car, it is unnecessary to change the group depending upon the number of the electrical devices and the signal sources and it is a relatively simple matter to add an electrical device or a switch source.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A signal operation apparatus for controlling a plurality of electrical devices comprising: central operation means for generating a control signal for the electrical devices, a plurality of terminal operation means, signal transmitting means for transmitting signals between the central operation means and the plurality of terminal operation means, each terminal operation means corresponding to an electrical device for driving the corresponding electrical device depending upon the control signal and for forming a composite signal on the signal transmitting means indicating the state of the corresponding electrical device, each of the plurality of terminal operation means comprising input-output signal operation circuit means for receiving the control signals of the central operation means, signal separation circuit means for discriminating the control signals for the corresponding electrical device, driving circuit means responsive to the control signal for the corresponding electrical device for operating the electrical device, return signal generating circuit means for generating a return signal upon detection of a malfunction of the electrical device, the input-output signal operation circuit means also functioning for combining the control signal for the corresponding electrical device and the return signal to form the composite signal on the signal transmitting means, means for connecting the signal separation circuit means to the input-output signal operation circuit means, means for connecting the signal separation circuit means to the driving circuit means, means for connecting the signal separation circuit means to the return signal generating circuit means, means for connecting the driving circuit means to the return signal generating circuit means, means for connecting the driving circuit means to the corresponding electrical devices, and means for connecting the input-output signal operation means to the return signal generating circuit means.

2. A signal operation apparatus according to claim 1 wherein the central operation means generates a reference timing pulse signal and a synchronizing pulse signal and driving command pulse signals to the electrical devices as control signals and the signal separation circuit counts the reference timing pulse signal to detect the pulse width of the synchronizing pulse signal for detecting the initiation of the repeating period of the control signal and also to detect the corresponding driving command pulse signal for discriminating whether it is the control signal for the corresponding electrical device or not.

3. A signal operation apparatus according to claim 1, wherein the return signal generating circuit operates the input-output signal operation circuit when the corresponding electrical device is operated by the control signal whereby the signal transmitting means is grounded by the input-output signal operation circuit so as not to couple the control signal to the signal transmitting means.

4. A signal operation apparatus according to claim 1, wherein each of the return signal generating circuits comprises a potential detecting circuit connected to the corresponding electrical device and a returning signal composite circuit which is connected to the potential detecting circuit, the corresponding signal separation circuit and the corresponding input-output signal operation circuit and the return signal composite circuit feeds a signal corresponding to the state of the corresponding electrical device to the corresponding input-output signal operation circuit.

5. A signal operation apparatus according to claim 4, wherein one end of the electrical device is grounded and a resistor is connected between the other end and the corresponding potential detecting circuit and a power source is connected to the contact of the resistor with the corresponding potential detecting circuit.

6. A signal operation apparatus according to claim 4, wherein the return signal composite circuit interrupts the output signal to the corresponding input-output signal operation circuit when the corresponding electrical device is broken and/or short-circuited.

7. A signal operation apparatus according to claim 5, wherein the return signal composite circuit feeds an output to the corresponding input-output signal operation circuit when the corresponding electrical device is in its normal state whereby the signal transmitting means is grounded by the input-output signal operation circuit so as not to couple the control signal to the signal transmitting means and the return signal composite circuit stops feeding the output signal to the corresponding input-output signal operation circuit when the corresponding electrical device is interrupted and/or short circuited whereby the signal transmitting means is not grounded by the input-output signal operation circuit to couple the control signal on the signal transmitting means.

8. A signal operation apparatus according to claim 1, wherein the input-output signal operation circuit comprises a buffer circuit and a transistor connected to the signal transmitting means.

9. A signal operation apparatus according to claim 2, wherein each of the signal separation circuits comprises a flip-flop for detecting the synchronizing pulse signal, a first counting circuit to which the output signal of the flip-flop and the reference timing pulse signal are input and a second counting circuit which is connected to the flip-flop and the first counting circuit.

10. A signal operation apparatus according to claim 4, wherein each of the potential detecting circuits comprises two potential detecting circuits which have different detected potentials with respect to each other.

11. A signal operation apparatus according to claim 10 wherein each of the return signal composite circuits comprises the corresponding two potential detecting circuits, a plurality of AND circuits which are connected to the corresponding driving circuits to detect the state of fault of the corresponding electrical devices and a plurality of gate circuits which can convert the output signals of the AND circuit to a time division multiple signal.

12. A signal operation apparatus according to claim 1, wherein the input-output signal operation circuit, the signal separation circuit, the driving circuit and the return signal generating circuit are an electronic circuit.

13. A signal operation apparatus which comprises central operation means for generating a control signal for at least two controlled devices, a plurality of terminal operation means, signal transmitting means for transmitting signals between the central operation means and the terminal operation means, the plurality of terminal operation means including at least two terminal operation means, each corresponding to a controlled device for driving the corresponding controlled device depending upon the control signal of the central operation apparatus and for forming a composite signal on the signal transmitting means indicating the state of the corresponding electrical device, and at least one terminal operation means corresponding to a signal source for forming a composite signal on the signal transmitting means indicating the state of the signal source, each of the terminal operation means for the controlled devices and the terminal operation means for the signal source comprising input-output signal operation circuit means for receiving the control signals of the central operation means, signal separation circuit means for discriminating the control signals for the corresponding controlled device or signal source, driving circuit means responsive to the control signal for the corresponding controlled device for operating the controlled device, return signal generating circuit means for generating a return signal upon detection of a malfunction of the electrical device or of the signal source or a signal of the signal source, the input-output signal operation circuit means also functioning for combining the control signal for the corresponding electrical device and the return signal to form the composite signal on the signal transmitting means, means for connecting the signal separation circuit means to the input-output signal operation circuit means, means for connecting the signal separation circuit means to the driving circuit means, means for connecting the signal separation circuit means to the return signal generating circuit means, means for connecting the driving circuit means to the return signal generating circuit means, means for connecting the driving circuit means to the corresponding controlled device, and means for connecting the input-output signal operation means to the return signal generating circuit means using similar circuit structures, the circuits of the terminal operation means for the controlled devices being the same as that of the terminal operation means for the signal source.

14. A signal operation apparatus according to claim 13, wherein the central operation means generates the control signal for the controlled devices depending upon the states of the terminals of at least two controlled devices and at least one signal source, at least two terminal operation apparatuses for the controlled devices generate signals for the states of the corresponding controlled devices and the terminal operation apparatuses for the controlled devices generate signals for the states of the corresponding controlled devices through the signal transmitting means to the central operation means.

15. A signal operation apparatus according to claim 13, wherein the central operation means generates a reference timing pulse signal and also a synchronizing pulse signal and driving command pulse signals for the controlled devices as control signals and the signal separation circuits count the reference timing pulse signal to detect the pulse width of the synchronizing pulse signal for detecting the initiation of the repeated period of the control signal and to detect the corresponding driving command pulse signals for discriminating whether it is the control signal for the corresponding controlled device or not.

16. A signal operation apparatus according to claim 14, wherein the return signal generating circuit operates the input-output signal operation circuit when the corresponding controlled device is operated by the control signal whereby the signal transmitting means is grounded by the input-output signal operation circuit so as not to give the control signal to the signal transmitting means.

17. A signal operation apparatus according to claim 14, wherein each of the return signal generating circuits comprises a potential detecting circuit connected to the corresponding controlled devices or signal source and a return signal composite circuit which is connected to the potential detecting circuit, the corresponding signal separation circuit and the corresponding input-output signal operation circuit and the return signal composite circuit feeds a signal corresponding to the states of the corresponding controlled devices or the signal source to the corresponding input-output signal operation circuit.

18. A signal operation apparatus according to claim 17, wherein one end of the electrical device is grounded and a resistor is connected between the other end and the corresponding potential detecting circuit and a power source is connected to the contact of the resistor with the corresponding potential detecting circuit.

19. A signal operation apparatus according to claim 17, wherein the return signal composite circuit interrupts the output signal to the corresponding input-output signal operation circuit when the corresponding electrical device is broken and/or short-circuited.

20. A signal operation apparatus according to claim 18, wherein the return signal composite circuit feeds an output to the corresponding input-output signal operation circuit when the corresponding electrical device is in its normal state whereby the signal transmitting means is grounded by the input-output signal operation circuit so as not to couple the control signal to the signal transmitting means and the return signal composite circuit stops feeding the output signal to the corresponding input-output signal operation circuit when the corresponding electrical device is interrupted and/or short circuited whereby the signal transmitting means is not grounded by the input-output signal operation circuit to couple the control signal on the signal transmitting means.

21. A signal operation apparatus according to claim 13, wherein the input-output signal operation circuit comprises a buffer circuit and a transistor connected to the signal transmitting means.

22. A signal operation apparatus according to claim 15, wherein each of the signal separation circuits comprises a flip-flop for detecting the synchronizing pulse signal, a first counting circuit to which the output signal of the flip-flop and the reference timing pulse signal are input and a second counting circuit which is connected to the flip-flop and the first counting circuit.

23. A signal operation apparatus according to claim 17, wherein each of the potential detecting circuits comprises two potential detecting circuits which have different detected potentials with respect to each other.

24. A signal operation apparatus according to claim 23, wherein each of the return signal composite circuits comprises the corresponding two potential detecting circuits, a plurality of AND circuits which are connected to the corresponding driving circuits to detect the state of fault of the corresponding electrical devices and a plurality of gate circuits which can convert the output signals of the AND circuit to a time division multiple signal.

25. A signal operation apparatus according to claim 13, wherein the input-output signal operation circuit, the signal separation circuit, the driving circuit and the return signal generating circuit are an electronic circuit.

26. A signal operation apparatus according to claim 13, wherein the signal source is a switch.

27. A signal operation apparatus according to claim 13, wherein a resistor is connected in parallel to the signal source.

28. A signal operation apparatus according to claim 27, wherein first ends of the signal source and the resistor are grounded and second ends are connected to the terminal operation means for the signal source and are also connected to the power source.

29. A signal operation apparatus according to claim 13, wherein the circuits of the terminal operation means for the controlled devices are the same as that of the terminal operation means for the signal source, the circuits of the signal separation circuits for both of the terminal operation means are the same, the circuits of the driving circuits for both of the terminal operation means are the same and the circuits of the return signal generating circuits for both of the terminal operation means are the same.

30. A signal operation apparatus according to claim 1 wherein the input-output signal operation circuit, the signal separation circuit, the driving circuit and the return signal generating circuit of each of the terminal operation means are formed by integrated circuits or printed wiring circuits.

* * * * *